United States Patent [19]
Goldsmith et al.

[11] 3,730,183
[45] May 1, 1973

[54] PERITONEAL DIALYSIS APPARATUS
[75] Inventors: Henry John Goldsmith; Frank Kirk, both of Liverpool, England
[73] Assignee: Whiteley Lang and Neill Limited, Liverpool, England
[22] Filed: July 1, 1970
[21] Appl. No.: 51,494

[52] U.S. Cl..................................128/213, 128/230
[51] Int. Cl......................A61m 05/00, A61m 01/00
[58] Field of Search.................128/213, 214 R, 227, 128/230, 348; 210/321

[56] References Cited

UNITED STATES PATENTS

| 3,410,268 | 11/1968 | Leucci | 128/227 |
| 3,620,215 | 11/1971 | Tysk et al. | 128/213 |
| 3,545,438 | 12/1970 | De Vries | 128/213 |
| 3,520,298 | 7/1970 | Lange | 128/213 |
| 3,228,397 | 1/1966 | Moss | 128/214 E |

OTHER PUBLICATIONS

Boen et al. – Trans. Amer. Soc. Artif. Inter. Orgs. Vol VIII 1962, pp 256–262
Boen et al. – Trans. Amer. Soc. Artif. Inter. Orgs. Vol X 1964, pp 409–414
Tenckhoff et al. – Trans. Amer. Soc. Artif. Inter. Orgs. Vol XV, 1969 pp 103–107

Primary Examiner—Dalton L. Truluck
Attorney—Linton and Linton

[57] ABSTRACT

The invention is concerned with apparatus for use in the treatment of acute and chronic renal failure by peritoneal dialysis and provides Dialysis apparatus comprising a bulk supply container for dialysate, a bulk waste container, an adjustable head gravity feed container provided with controlled heating means, a fluid flow line between said gravity feed container and said bulk supply and waste containers, a pump for pumping dialysate from the bulk supply container to the gravity feed container, means for determining the amount of dialysate pumped to the gravity feed container, a fluid flow line from the gravity feed container for association with a cannula placed in a patient, a fluid flow line for association with said cannula and leading to the bulk waste container, a vacuum pump and control means for reducing the pressure in the bulk waste container thereby to assist the outflow of dialysate from a patient to said container, weighing means for the bulk supply and bulk waste container, and an electro-magnetic control circuit which provides for the automatic control of the apparatus.

7 Claims, 6 Drawing Figures

Patented May 1, 1973
3,730,183
4 Sheets-Sheet 1
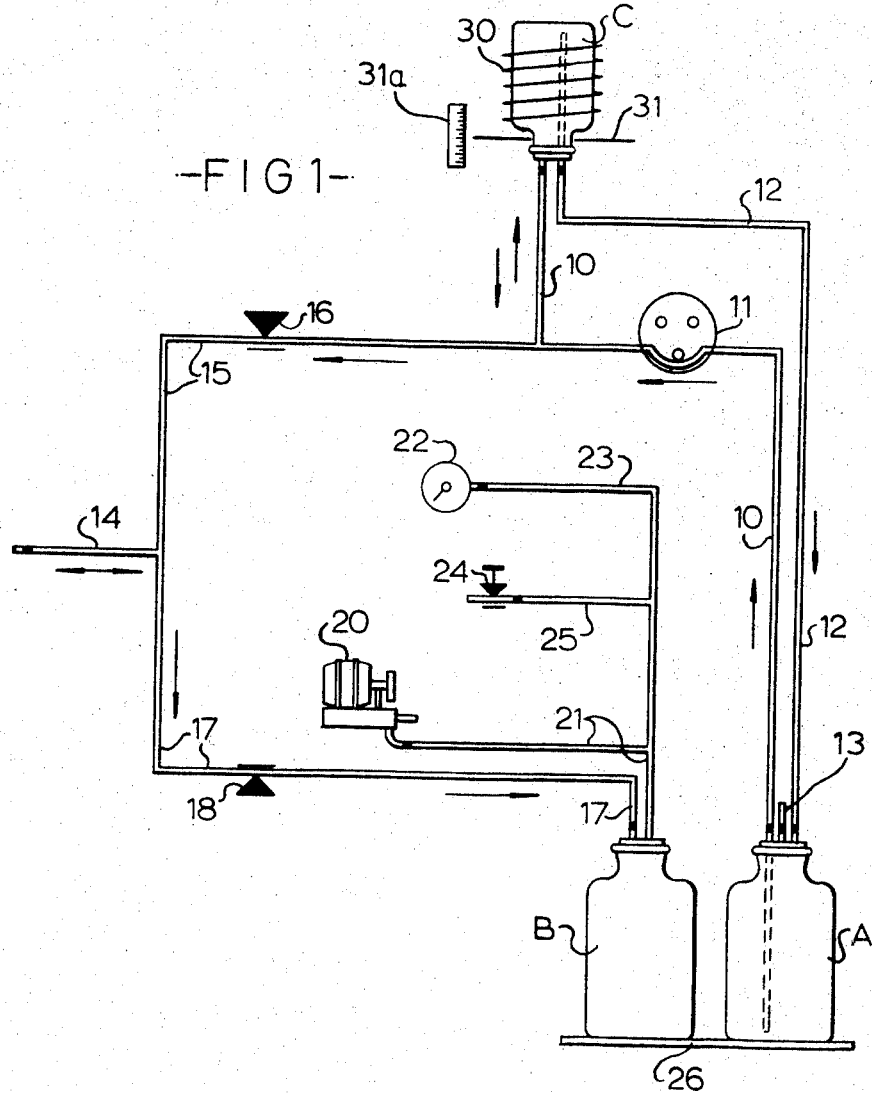
-FIG 1-
INVENTORS
HENRY JOHN GOLDSMITH AND
FRANK KIRK
BY
*Linton and Linton*
ATTORNEYS

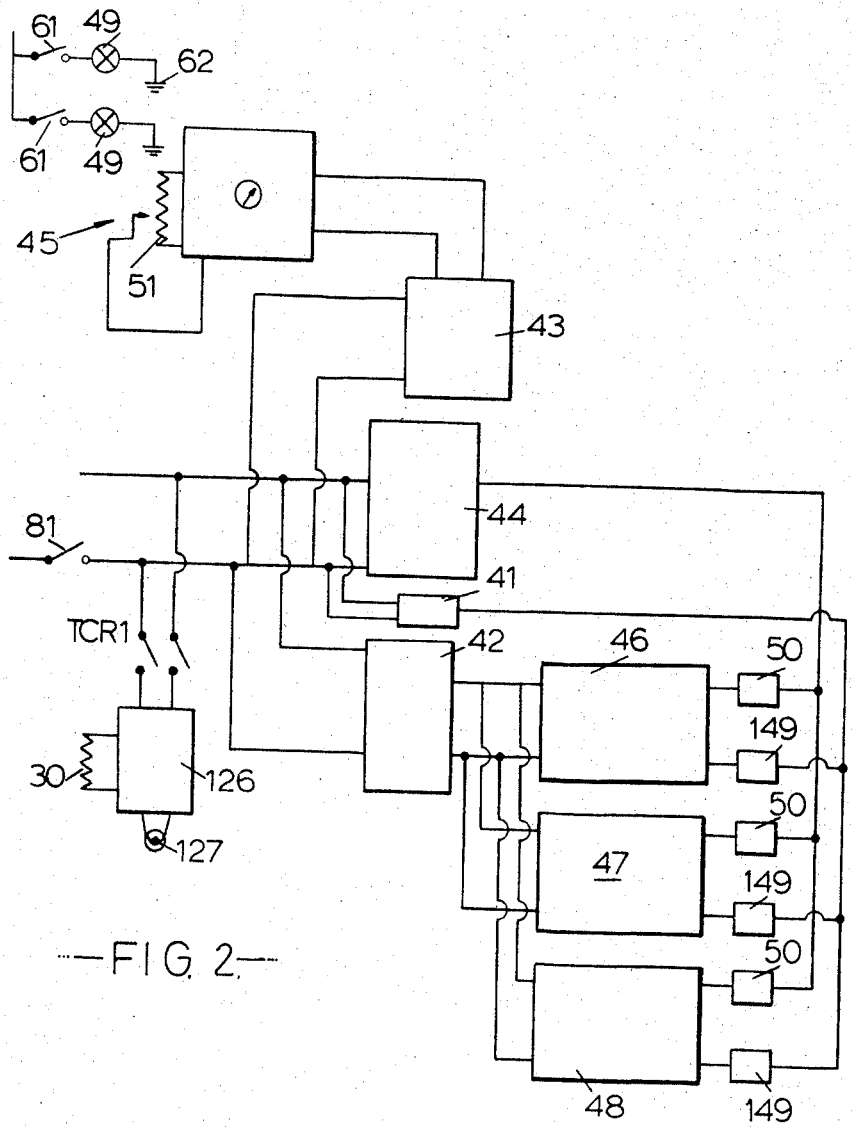
—FIG. 2—

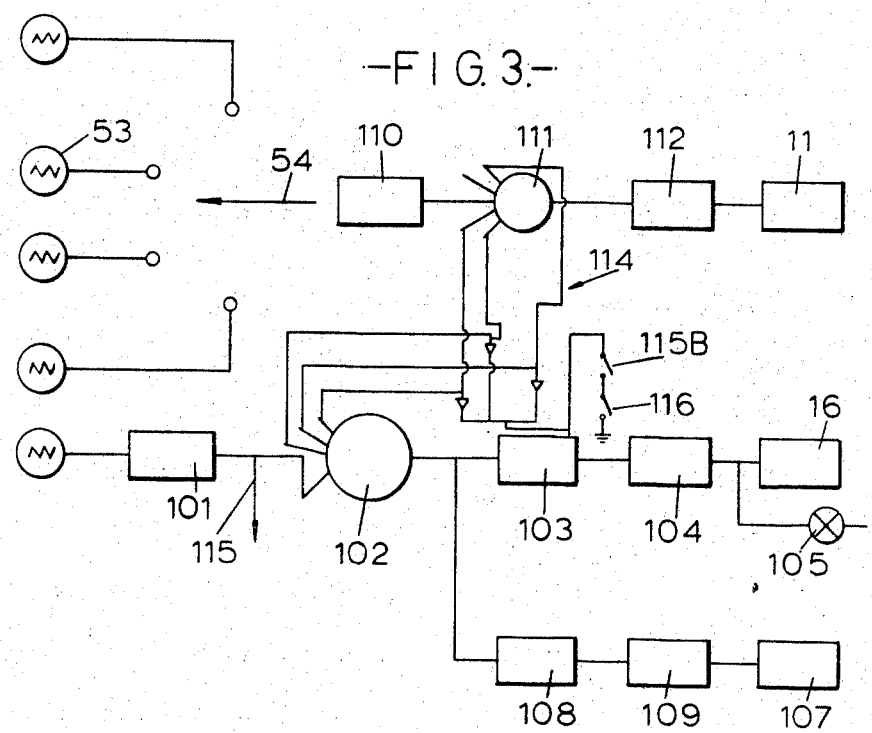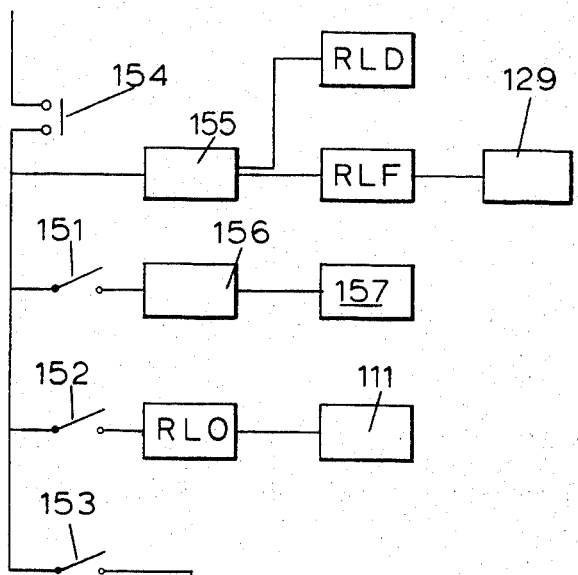

Patented May 1, 1973
3,730,183
4 Sheets-Sheet 4
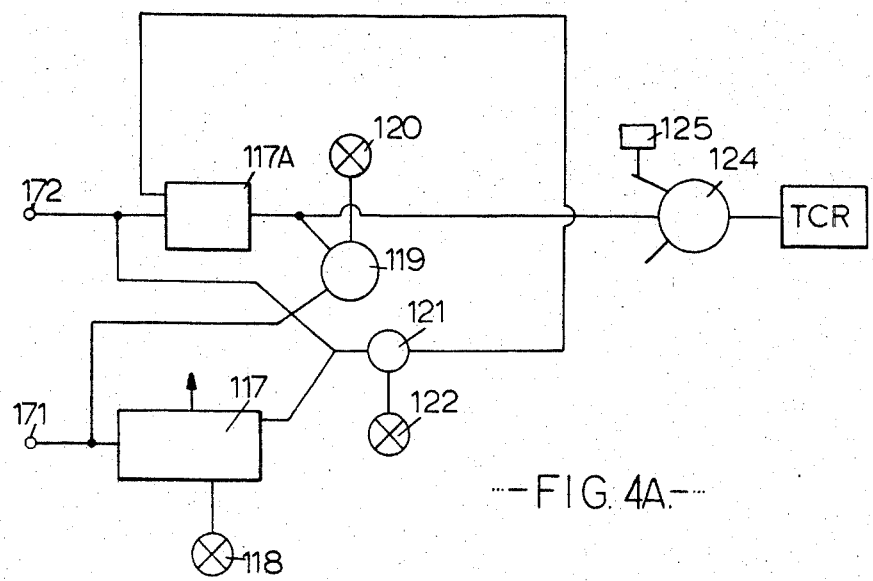
— FIG. 4A.—
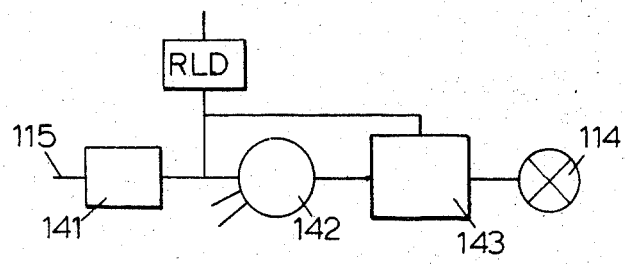
— FIG. 4B.—
INVENTORS
HENRY JOHN GOLDSMITH AND
FRANK KIRK
BY
*Linton and Linton*
ATTORNEYS

PERITONEAL DIALYSIS APPARATUS

This invention relates to apparatus for use in the treatment of acute and chronic renal failure by peritoneal dialysis.

The conventional method of effecting peritoneal dialysis includes the use of clamps, a drip set, and single liter exchange containers, and entails careful and time consuming attention on the part of a competant nursing staff. Further, the frequent handling of waste fluid bottles for measuring purposes, together with the necessary frequent adjustment of clamps and the consequent handling of the drip sets, constitutes a recognized infection hazard.

To obviate the above disadvantages, various attempts have been made to automate the Dialysis procedure, and while several types of apparatus have heretofore been evolved none of these, so far as we are aware, has proved entirely satisfactory in use.

The present invention has for its object to provide peritoneal dialysis apparatus which will be automatic in use and will obviate the problems referred to above. More specifically the invention has for its object to provide peritoneal dialysis apparatus which preferably, a. incorporates a closed sterile fluid flow circuit wherein all valves, pumps and the like are external to the fluid flow circuit;
b. provides an adjustable head gravity inflow of fluid at body temperature to a patient and which incorporates means which operates to prevent inflow of dialysate when the dialysate temperature variations are excessive;
c. enables the volume of fluid inflow per cycle to be present within a predetermined range;
d. has a capacity for effecting a plurality of cycles or exchanges;
e. enables automatic time control of the dwell and outflow periods of an exchange cycle;
f. provides for the fluid inflow and fluid outflow to be positively monitored by a weighing system thereby to detect, and warn of, excessive fluid retention or depletion by a patient; and
g. provides for a safety interlock such that fluid may not be transferred from the supply pump to the patient.

To this end, automatic peritoneal dialysis apparatus according to the invention, and in one embodiment, comprises a bulk supply container for dialysate, a bulk waste container, an adjustable gravity feed container provided with controlled electric heating means, a replaceable fluid flow line between said gravity feed container and said bulk supply and waste containers, a peristaltic pump for pumping dialysate from the bulk supply container to the gravity feed container, means for controlling the amount of dialysate pumped to said gravity feed container, a fluid flow line from the gravity feed container for association with a fitment for connection with a cannula placed in a patient, a fluid flow line for association with the cannula and leading to the bulk waste container, a vacuum pump and control means for reducing the pressure in the waste container thereby to assist the outflow of dialysate from a patient to said container, and weighing means for weighing the bulk supply and bulk waste containers.

The system is controlled electrically and electromagnetically whereby the gravity feed container delivers a predetermined amount of dialysate to a patient, and the weighing system of the bulk supply container and the waste container monitors inflow and outflow of the dialysate.

The control system also includes adjustable timers for controlling the dialysate dwell time and outflow time, and an adjustable timer arranged to switch off the machine after a predetermined time has elapsed in the event an exchange cycle is not completed comma, e.g., due to a malfunctioning of the apparatus by a blockage in the feed circuit.

The invention is further described with the aid of the accompanying explanatory drawings.

In said drawings:

FIG. 1 is a diagrammatic view of the apparatus showing the fluid flow circuit.

FIG. 2 is a block diagram of a control unit, and

FIGS. 3, 4 and 5 are block diagrams of printed circuits used in FIG. 2.

Referring to said drawings, A generally denotes a bulk supply container for holding dialysate, B a waste container, and C a gravity feed container wherefrom dialysate can be supplied by gravity to the patient.

The supply container A is connected to the gravity feed container C by means of a fluid flow line 10 wherewith is associated a peristaltic pump 11. Also provided is an overflow tube 12 which leads as shown from the gravity feed container C back to the supply container A. Said container A is provided with an air vent tube 13.

Between the tube 10 and a tube 14 leading to a patient to be treated, is an inflow tube 15 incorporating an electro-magnetically operated pinch valve 16. Between said tube 14 and the waste container B is an outflow tube 17 incorporating an electro-magnetically operated pinch valve 18. A vacuum pump 20 is associated with the waste container B by means of a tube 21 and also connected thereto by a tube 23 is a vacuum gauge 22. The induced vacuum is controlled by use of an electro-magnetically operated pinch valve 24 operating upon a tube 25 which is open to atmosphere.

The gravity feed container C is provided with electric heating means 30 whereby the dialysate pumped thereto from the supply container A may be heated to required temperature, and said container C has dialysate volume sensing means 31 which determine the amount of fluid pumped into said container by the pump. This sensing means 31 senses the volume of the dialysate in container C by means of photo cells 53 (FIG. 3).

The apparatus comprises an electronically and electro-mechanical control unit arranged so that the apparatus may be set to automatically perform any number (within limits) of exchange cycles in which control of the dialysate is exercised in respect of:- (a) temperature; (b) quantity of inflow to the patient; and (c) quantity of outflow from the patient.

The said control unit consists of a chassis and front panel assembly supplied from the electricity mains through an isolating switch 8. The front panel contains three motorized timers 151, 152 and 153, FIG. 5. These timers are Elremco Planet DV types with 24v AC Motors and clutches, two of said timers being variable from 0 to 60 minutes and the third from 0 to 120 minutes. A two digit, preset counter type, English Numbering Machine, 435 series, with a 24v DC coil, is used to set the number of cycles and counts down to zero. Illuminated push buttons are provided, for example of the type manufactured by Burgess Micro Switch Company Limited, type H24200. The chassis contains all necessary termination, plugs and sockets for all incoming, outgoing and internal connections. Silicon output transistors (type 2N5036) are mounted on insulators on the chassis, and are shown in FIG. 2 along with other controlled elements which consume more power than can be dissipated on the printed circuit boards by blocks 149 and 150. There are three stabilized power packs 41, 42 and 43 and an unstabilised power pack 44. The power pack 41 includes a 50 watt zener type IR IN3311 and is fitted to the chassis as also is the power pack 44 which includes a T1 bridge rectifier type 1B40K10. The power packs 41 and 44 with two Smoothing 1,000 microfarad 70 volt capacitors supply the 24v DC to the pumps and valves and also to the push button indicators.

Four plug in printed circuits include the power pack 43 with stabilized 9v DC supplies for photo cell lamps and for an electro-magnetic weigher 45 and the power pack 42 which gives the 24v DC for the logic boards on a printed circuit 46 (type Number PDU 131169). Thermometer control, high temperature cut out and dwell timer control, are on a printed circuit 47 (type Number 111169). Control circuits associated with photo cells 53, FIG. 5, supply pump, inflow and counter drive are on a printed circuit 46 (type Number 141169) which includes contacts for controlling the inflow valve 16 and the start function (cycle) timer control, alarm circuit and outflow timer control are on a printed circuit 48 (type Number 151169) which includes contacts for closing the outflow valve 18. All the logic is performed using silicon planar transistors and high quality carbon film resistors, etc. The chassis also contains a socket to accept the plug of an ON/OFF temperature controller printed circuit (type Number 12570). This accepts the signal from a STC G23DY thermistor incorporated in a special thermometer assembly made by The Electrical Thermometer Company, and controls the power supplies through a Diamond H type BW 024D1/086 relay on the chassis, to the (200w Isomantle) heater 30 (FIGS. 1 and 2). Five photo electric level detection heads each contain a Vitality type 280 12v lamp and a GE L14B2 silicon photo Darlington amplifier. The incoming supply to the chassis is 24v AC at a maximum of 15A and this is obtained from a remote transformer in the base of the machine. The highest voltage on the chassis is therefore only 24v AC.

A four position switch 54, FIG. 3, on the panel, giving 0.5, 1.0, 1.5 and 2.0 liter settings, selects one of four top photo-electric cells 53 and serves as the means 31. The total of five photo-electric cells are mounted in a stack alongside the gravity feed container C with a level tube from the container passing through the stack. The photo-electric cells are set at intervals of 0.5 liter of capacity of the container C. The selected one of the top four photo-electric cells can be brought into circuit by the switch 54 to control the amount of feed to a patient to 0.5, 1.0, 1.5 and 2.0 liters respectively.

The machine's cycle times are set on three timers on the panel namely a dwell timer 152, an outflow timer 153 and total cycle or function timer 151, and an electronic counter 107 sets the number of cycles. The counter 107 is interposed functionally between contacts of the outflow timer to prevent initiation of a further cycle after the required number of cycles has been counted. The dwell is the length of time the dialysate is retained by the patient, the outflow time is the time allowed for dialysate outflow from patient and the total cycle time is the time allowed for each complete cycle.

The sterile supply container A and the waste container B are mounted on a balance platform 26 in the machine which guards against dialysate retention or depletion by the patient as the bodies natural fluid balance must be kept within limits. To assist in controlling the fluid balance a potentiometer 51, FIG. 2 and two limit micro-switches 61 are included in the circuit working off the movement of the balance platform 26 as it loses and gains weight due to fluid movement. The two limit micro-switches 61 are used to keep the patient's fluid balance within an adjustable tolerance, one for fluid retained by the patient and one for fluid taken from the patient. If either of the micro switches 61 are tripped during a machine cycle, the relevant balance warning light 49 is illuminated (HIGH or LOW) and at the end of that cycle an audible alarm operates and the machine will not follow on to the next cycle until the balance has been restored. The electromagnetic weigher 45 detects movement of the platform 26 and includes the potentiometer 51 whose position is indicated on the control panel by a ± 50 microammeter 52 graduated in liters (±from a center zero).

The printed circuit 46 is shown in simplified block diagram in FIG. 3. The lowermost of the photo-electric cells drives a switch 101 which transmits a signal through a gate 102, an emitter follower 103, an output transistor 104 to the inflow valve 16, and to an inflow light 105 in parallel with said inflow valve 16. The gate 102 also feeds the counter 107 through another emitter follower 108 and an output transistor 109. The photoelectric cell 53 selected by the switch 54 controls a switch 110 which feeds the supply pump 11 through a gate 111 and an output transistor 112. Provision 114 is made for earthing inputs of the gates 102, 111 to disable this printed circuit when a supply pump manual button 115B is actuated when an alarm transistor switch 116 is conductive.

The inputs of the gate 102 are signals denoting the photo-electric cell has sensed the correct dialysate level, that the temperature of the dialysate is normal, that the cycle is progressing, that the outflow, dwell, and supply pump are operative. The gate 111 receives inputs determining that the cycle has been initiated, that the cycle is still in being, that the dialysate level is correct, that inflow is not in progress.

The switch 101 also sets an enabling circuit over a line 115 for a relay RLD in FIG. 4B which initiates a cycle of the dwell timer 152. The line 115 sets an enabling circuit for the relay RLD and feeds a lamp 144 through a transistor switch 141 a gate 142 and a circuit 143. The printed circuit 47 also receives high or normal temperature signals on terminals 171 and 172, FIG. 4, which are convertible into 'not high' and 'not normal' signals in respective gates and 117 and 117A. The 'not normal' signal is used to illuminate a low temperature light 118. An 'AND' gate 119 sees that the temperature is at least normal but is not high and lights a NORMAL TEMPERATURE lamp 120. Similarly an 'AND' gate 121 is used to light a HIGH TEMPERATURE lamp 122. The 'not high' signal is used to hold a relay TCR closed through a gate 124 which receives interlocking signals from a thermometer plug 125 and denoting the temperature is acceptable. The relay TCR energizes through contacts TCR' a proportional temperature controller 126 (FIG. 2) which controls the heater 30 under the control of a thermistor 127.

In FIG. 5 there are shown the contacts of the three timers 151, 152, 153 under the control of a start button 154. The signal provided by the start button passes an inhibit network 155 which prevents an exchange cycle commencing if any parameter is wrong and calls in the timer 151 by means of a relay RLF and establishes a circuit for relay RLD controlling timer 152. Operation of the timer 151 produces a signal which is stored in a memory 129 and used for indicating that an exchange cycle is in operation. Completion of a cycle actuates a bistable multivibrator 156 which is used to sound an alarm 157. When the inflow is allowed to start after the conditions are correct and when the inflow is completed as sensed by the bottom photo-electric cell 53, the inhibits or restraints on the operation of the relay RLD are removed and this relay is allowed to operate calling in the dwell timer 152. After the dwell period this timer 152 calls an outflow relay RLO, the outflow valve 18 and the vacuum pump 20. At the end of the cycle as sensed by the timer 153 the inhibit signals to the circuit board 46 are removed by short circuiting the signal to ground and inflow can commence in a new cycle.

Consider a typical control sequence of the machine:- Firstly, the dialysate volume and machine cycle times are set to suit a patient. The mains power switch is pressed and the outflow solenoid valve 18 operates closing the outflow tube 17, FIG. 1. The audible alarm operates indicating the machine is 'on' and the reset alarm button is pressed to reset the alarm bistable multivibrator 156 to cancel the signal. At this stage, both the INFLOW and OUTFLOW valves (16, 18) are closed.

The start cycle button is pressed. The SUPPLY PUMP 11 commences to pump dialysate from the supply container A to the gravity feed container C.

When the dialysate level reaches the bottom (common) photo-electric cell, the heater 30 brings itself into circuit since the thermistor in the proportional temperature control circuit senses the cold dialysate and the heater 30 commences to heat the dialysate as the flow into the gravity feed container C continues. When the correct amount of dialysate has been pumped into the container C (indicated by the relevant photo-electric cell) the supply pump 11 cuts out and the dialysate is brought to its correct temperature which will be indicated by the thermometer, the terminals whereof are designated 171, 172. The thermistor 127 controls the heater 30 during this period, the voltage to the heater decreasing proportionately as the dialysate approaches the correct temperature. At the correct temperature the voltage is, in theory nil. Conversely, if the temperature of the dialysate drops the voltage to the heater 30 increases.

On the control panels are two lamps 118, 120 on the thermometer circuit indicating low and normal temperatures respectively and a lamp 122 indicating high temperature. There is a tolerance of 10°C between low temperature and high temperature, the dialysate reaching correct temperature at 33°C and the high temperature indicating light operating at 43°C. If this point is reached the high temperature cut-out relay TCR cuts off power to the heater/thermistor circuit (controller 126) via the contact TCR 1 on the proportional temperature control. A high temperature control reset switch (not shown) is pressed after the fluid has cooled to bring the heater/thermistor into the circuit once more.

When the two conditions of dialysate level and dialysate temperature have been fulfilled, the inflow cycle commences, i.e., the INLET valve 16 operates allowing dialysate from the container C to drain into patient via tube 14.

When the dialysate level in the container C drops to the level of the bottom photo-electric cell, the INLET valve 16 closes on a signal from the 'AND' gate 102 and the dwell cycle starts.

As the dwell cycle starts, the supply pump 11 is reactivated and commences to pump dialysate up to the container C for the subsequent cycle, assuming the cycle counter control 107 indicates that there is another cycle to follow, i.e., it does not indicate zero.

If the counter 107 reads zero, a COUNTER ZERO switch operates, a last cycle lamp illuminates and the supply pump 11 will not restart a fresh cycle.

If another cycle is to follow, the dialysate is heated to the correct temperature whilst the dwell and outflow sequences of the cycle in being, continues.

When the dwell cycle is completed, the outflow cycle commences allowing dialysate to drain from the patient into the waste container B as the valve 18 of outflow tube 17 is released. A vacuum on/off switch is operated starting the vacuum pump 20 which draws air from the sealed waste container B assisting the gravity drain from patient. The vacuum control 24 is adjusted to suit the conditions of fluid capacity, outflow time, etc. On subsequent cycles, the vacuum pump 20 will start automatically on a signal from the relay RLO. On completion of the OUTFLOW cycle and the total cycle time, the machine repeats the cycle assuming the necessary conditions are fulfilled.

The control unit therefor functions to discontinue an exchange cycle if, (a) the temperature of the dialysate is above a predetermined high limit and; (b) the temperature of the dialysate is below a predetermined low limit. If the quantity of the fluid inflow does not equal the quantity of fluid outflow within the prescribed limits then the alarm is sounded and a new cycle cannot start. Further, visual and/or audible alarms operate should cycling not start after a preselected time as set upon the respective timer.

Other controls not shown include manual controls for the supply pump 11, inflow cycle, and outflow cycle for use under certain conditions, e.g., in priming the machine, and a jackplug point for connecting a remote audible alarm warning.

It will be seen that the apparatus will enable a predetermined volume of dialysate to be pumped into the gravity feed container C from the main supply container A, the amount of fluid being predetermined by setting relation to a measuring scale 30a associated with the volume sensing means 31 of the gravity feed container C. The dialysate is automatically heated in the container to required temperature and allowed to drain by gravity to the patient.

The dwell time, i.e., that time during which the dialysate remains in the peritoneal cavity, is automatically controlled by a timer the required period being preset on a provided dial of the timer, and after an appropriate dwell period the dialysate is drained from the peritoneal cavity to the waste container B. Draining is effected primarily by gravity, but may be aided by the vacuum induced in the container B by the pump 20, the pressure being controlled by the adjustable valve 24 and recorded on the vacuum gauge 22.

Sterility of the equipment can be ensured by using a fresh, pre-sterilized, set of fluid flow lines each time the machine is used. In this correction it will be noticed that the peristaltic pump 11, the valves 16, 18 etc., all operate on the outside of the fluid flow line tubes whereby there is no external contact with the dialysate being handled. The various flow lines may be differently colored or otherwise marked to facilitate identification when being renewed.

The temperature of dialysate in the gravity feed container C preferably is controlled by means of an externally fitted contact thermometer in the form of the thermistor 127 and its associated contact 126.

The complete apparatus may be housed in a cabinet of suitable construction and material and preferably is divided into two, upper and lower, compartments the top compartment being fitted with the control panel and arranged to hold the electrical and mechanical equipment, and the bottom compartment the supply and waste dialysate containers and weighing system. The adjustable head gravity feed container C usually will be supported above and externally of the cabinet.

The cabinet may be mounted on castors which allow it to be moved to any desired position of use.

We claim:

1. An automatic peritoneal dialysis apparatus comprising a bulk supply container for dialysate, a bulk waste container, an adjustable head gravity feed container, controlled heating means around said gravity feed container, said heating means having a temperature sensing means actuating said heating means a fluid flow supply line between said gravity feed container and said bulk supply container, a peristaltic pump for pumping dialysate from said bulk supply container to said gravity feed container, means for sensing and controlling the amount of dialysate pumped to said gravity feed container, a first fluid flow line from said gravity feed container for association with a cannula placed in a patient, a second fluid flow line for association with said cannula and leading to said bulk waste container, a vacuum pump and control means for reducing the pressure in said bulk waste container thereby to assist the outflow of dialysate from a patient to said container, automatic means for weighing said bulk supply and bulk waste containers, and electronic and electro-magnetic control means for causing said gravity feed container to deliver a predetermined amount of dialysate to a patient, and said weighing means of said bulk supply and bulk waste containers to monitor the inflow and outflow of dialysate and warn of excessive fluid retention or depletion by a patient, an inflow valve in said first fluid flow line, an outflow valve in said second fluid flow line, a dwell period timer having contacts connected to said outflow valve, an outflow timer having contacts connected to said outflow valve, an electronic and electro-magnetic control circuit having at least one gate for permitting inflow of dialysate to a patient via said inflow valve when the level and temperature of dialysate in the gravity feed container are correct, means for sensing when the inflow to the patient is complete and initiating closing of said inflow valve and operation of said dwell period timer for opening said outflow valve to permit outflow from the patient and initiating operation of said outflow timer for causing said outflow timer contacts to close said outflow valve at the end of the predetermined outflow time.

2. Dialysate apparatus, as claimed in claim 1, wherein said control means includes an adjustable timer arranged to switch off the apparatus after a predetermined time has elapsed in the event an exchange cycle is not completed.

3. Dialysis apparatus, as claimed in claim 2, wherein said control means incorporates means which operates to prevent flow of dialysate to a patient when its temperature is incorrect.

4. Dialysis apparatus, as claimed in claim 3, wherein said control means incorporates means which enables the volume of fluid inflow per cycle to a patient to be preset within a predetermined range, and means for effecting a predetermined number of exchange cycles.

5. Dialysis apparatus, as claimed in claim 4, wherein said control means incorporates timing means for automatically controlling said dwell and outflow periods of an exchange cycle.

6. Dialysis apparatus, as claimed in claim 5, wherein said control means incorporates a safety lock to prevent direct inflow of dialysate to a patient via the dialysate supply pump.

7. Dialysis apparatus, as claimed in claim 1, wherein said electronic and electro-magnetic control circuit includes an adjustable counter responsive to a predetermined number of cycles and interposed functionally between said contacts of said outflow timer to prevent initiation of a new cycle when said counter has counted a preset number of cycles.

* * * * *